United States Patent
Toyooka et al.

(10) Patent No.: US 11,412,770 B2
(45) Date of Patent: Aug. 16, 2022

(54) GEL-LIKE FOOD COMPOSITION

(71) Applicant: OTSUKA PHARMACEUTICAL CO., LTD., Tokyo (JP)

(72) Inventors: Keiko Toyooka, Osaka (JP); Koichiro Hamada, Osaka (JP); Hiroshi Saitoh, Osaka (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 24 days.

(21) Appl. No.: 16/064,865

(22) PCT Filed: Dec. 22, 2016

(86) PCT No.: PCT/JP2016/088315
§ 371 (c)(1),
(2) Date: Jun. 21, 2018

(87) PCT Pub. No.: WO2017/110988
PCT Pub. Date: Jun. 29, 2017

(65) Prior Publication Data
US 2019/0008197 A1    Jan. 10, 2019

(30) Foreign Application Priority Data
Dec. 25, 2015 (JP) .............................. JP2015-253929

(51) Int. Cl.
| | |
|---|---|
| A23L 33/135 | (2016.01) |
| A23L 33/175 | (2016.01) |
| A23L 29/206 | (2016.01) |
| A23L 33/19 | (2016.01) |
| A23L 33/125 | (2016.01) |

(52) U.S. Cl.
CPC ........... *A23L 33/135* (2016.08); *A23L 29/206* (2016.08); *A23L 33/125* (2016.08); *A23L 33/175* (2016.08); *A23L 33/19* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 8,367,145 B2 * | 2/2013 | Ishimoto | ................ A23L 33/17 426/656 |
| 2006/0182727 A1 | 8/2006 | Yamahira et al. | |
| 2010/0330197 A1 | 12/2010 | Higashiguchi et al. | |
| 2011/0052753 A1 | 3/2011 | Zanghi et al. | |
| 2012/0189597 A1 | 7/2012 | Greenberg et al. | |
| 2015/0313262 A1 | 11/2015 | Zanghi et al. | |

FOREIGN PATENT DOCUMENTS

| | | |
|---|---|---|
| CN | 101939011 A | 1/2011 |
| CN | 101951930 A | 1/2011 |
| CN | 102481009 A | 5/2012 |
| CN | 104323246 A1 | 2/2015 |
| EP | 2 880 996 A1 | 6/2015 |
| JP | 2002-153219 A | 5/2002 |
| WO | 2005/019438 A1 | 3/2005 |
| WO | 2009/157759 A1 | 12/2009 |
| WO | 2010/143939 A1 | 12/2010 |
| WO | 2012/170021 A1 | 12/2012 |
| WO | 2013/028547 A1 | 2/2013 |
| WO | 2014/155249 A1 | 10/2014 |

OTHER PUBLICATIONS

Extended European Search Report dated Jun. 13, 2019 from European Patent Office in counterpart European Application No. 16878875.0.

International Search Report of PCT/JP2016/088315 dated Apr. 4, 2017.

Wen Cai-xiong, "Resistance training and protein supplement: Improvement of elderly muscle protein metabolism", Chinese Journal of Tissue Engineering Research, Jun. 11, 2013, vol. 17, No. 24, pp. 4545-4552 (8 pages).

Anthony D. Keefe et al., "Evolution of the biosynthesis of the branched-chain amino acids", Origins of Life and Evolution of the Biosphere, 1995, vol. 25, pp. 99-110 (12 pages).

Office Action dated Jul. 5, 2021 by the Chinese Patent Office in Chinese Application No. 201680076203.6.

\* cited by examiner

*Primary Examiner* — Vera Afremova
(74) *Attorney, Agent, or Firm* — Sughrue Mion, PLLC

(57) ABSTRACT

Provided is a novel gel-like food composition. The gel-like food composition contains 0.1 to 10 wt % of a free branched-chain amino acid, 1 to 12 wt % of a protein, and $10^4$/g to $10^{14}$/g of a probiotic.

10 Claims, 2 Drawing Sheets

GEL-LIKE FOOD COMPOSITION

CROSS REFERENCE TO RELATED APPLICATIONS

This application is a National Stage of International Application No. PCT/JP2016/088315 filed Dec. 22, 2016, claiming priority based on Japanese Patent Application No. 2015-253929 filed Dec. 25, 2015.

TECHNICAL FIELD

An invention related to a gel-like food composition is disclosed.

BACKGROUND ART

Currently, a variety of gel-like food compositions for nutritional supplement are commercially available. There are known gel-like compositions for nutritional supplement of different formulations, for different purposes or consumer populations. It is preferable for individuals engaged in physical activity accompanied by exhaustion or fatigue to replenish proper nutrients over a certain period of time or a long period of time.

A gel-like food composition for the purpose of providing nutritional supplement contains various components. However, some problems arise depending on the type of components, and the combination thereof. For example, a gel-like food composition containing a specific amino acid (e.g., a branched-chain amino acid) is known to exhibit bitterness and/or unpleasant odor. Additionally, browning is known to be caused by the Maillard reaction that occurs between a protein, or amino acids, and a saccharide; and affects storage stability. Further, when a gel-like food composition containing protein exhibits poor dispersibility of the protein, a problem concerning smoothness arises during ingestion of the composition, resulting in a failure to obtain a gel-like food composition with excellent storage stability.

SUMMARY OF INVENTION

Technical Problem

An object is to provide a novel gel-like food composition that solves these problems.

Solution to Problem

The use of a specific formulation has been found to achieve the object. After extensive research on and modification of the findings, the following representative subject matter has been provided.

Item 1.

A gel-like food composition comprising 0.1 to 10 wt % of a free branched-chain amino acid, 1 to 12 wt % of a protein, and $10^4$/g to $10^{14}$/g of a probiotic.

Item 2.

The gel-like food composition according to item 1, further comprising 5 to 20 wt % of a saccharide.

Item 3.

The gel-like food composition according to item 1 or 2, further comprising 0.1 to 2.5 wt % of a free non-branched-chain amino acid.

Item 4.

The gel-like food composition according to any one of items 1 to 3, wherein the protein is whey protein.

Item 5.

The gel-like food composition according to any one of items 1 to 4, wherein the saccharide is at least one member selected from the group consisting of sucrose, glucose, and dextrin.

Item 6.

The gel-like food composition according to any one of items 1 to 5, wherein the free branched-chain amino acid is at least one member selected from the group consisting of valine, leucine, and isoleucine.

Item 7.

The gel-like food composition according to any one of items 3 to 6, wherein the free non-branched-chain amino acid is arginine.

Item 8.

The gel-like food composition according to any one of items 1 to 7, comprising a soybean polysaccharide.

Item 9.

The gel-like food composition according to item 8, wherein the soybean polysaccharide is present in an amount of 0.2 to 1.7 wt %.

Item 10.

The gel-like food composition according to any one of items 1 to 9, wherein the probiotic is a lactic acid bacterium.

Item 11.

The gel-like food composition according to any one of items 1 to 10, which is in a single-serve package form.

Item 12.

The gel-like food composition according to item 11, wherein the single-serve package form is 50 to 400 g.

Item 13.

The gel-like food composition according to any one of items 1 to 12, which is in a single-serve package form, the gel-like food composition being a degradation inhibitor of muscle protein, a fatigue recovery agent, and/or an immunostimulant.

Advantageous Effects of Invention

At least one of the following effects is provided.

(1) A gel-like food composition that exhibits excellent storage stability, with reduced coloration caused by the Maillard reaction between a free branched-chain amino acid and/or a protein, and a carbohydrate, is provided.

(2) A gel-like composition that exhibits excellent dispersibility of the components, a well-maintained gel state in storage, and an excellent flavor is provided.

(3) A gel-like food composition for alleviating muscle pain and/or fatigue is provided.

(4) A gel-like food composition that inhibits muscle protein degradation caused by physical activity, that further inhibits immune compromise, and that has biological defense action for preventing foreign matter from entering into the body is provided.

(5) A gel-like food composition expected to exhibit a heat stroke prevention effect is provided.

(6) A means that provides excellent recovery from exhaustion and/or fatigue, and that prevents or treats gastrointestinal distress accompanying stress (including stress caused by intense physical activity and/or weight loss on a restricted diet) is provided.

(7) A means that inhibits immune compromise accompanying stress (including stress caused by intense physical activity and/or weight loss on a restricted diet) is provided.

(8) A gel-like food composition that enables sustainable protein synthesis in vivo from the early stages after the intake of the composition is provided.

(9) A nutrition management supplementary food suitable for physical condition management of sport players or athletes is provided.
(10) A nutrition management supplementary food suitable for physical condition management of people with a profession that requires more physical strength than usual is provided.
(11) A supplementary food suitable for physical condition management or nutritional enhancement for elderly people is provided.
(12) A gel-like nutrition management supplementary food composition that is expected to have a pneumonia prevention effect on elderly people is provided.
(13) A gel-like nutrition management supplementary food composition that is expected to inhibit muscular atrophy or maintain skeletal muscle of elderly people is provided.
(14) A gel-like food composition in the form of an easily portable single-serve package (on a unit basis) is provided.

DESCRIPTION OF EMBODIMENTS

Figure 1:
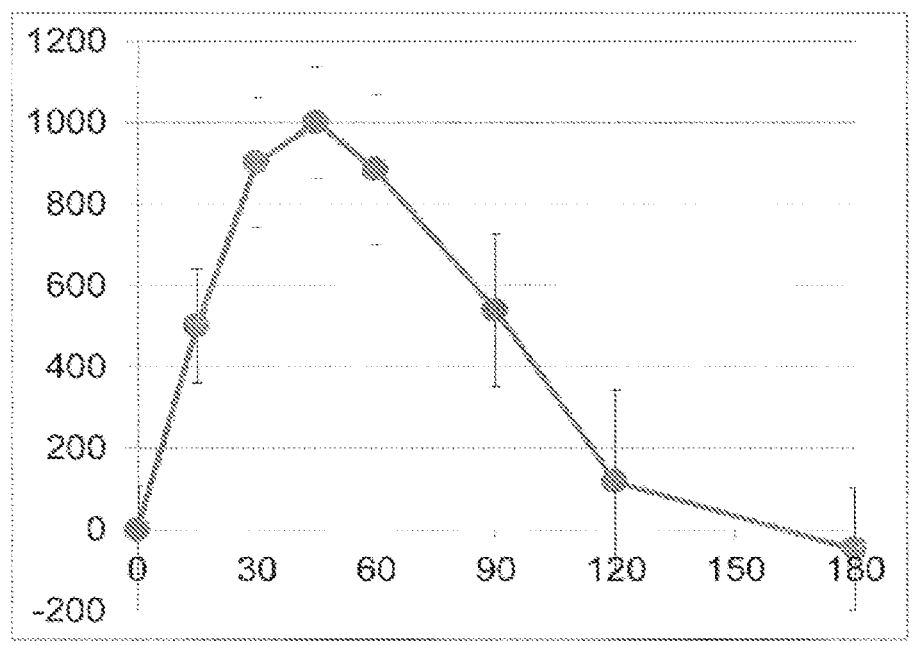
FIG. 1 is a graph that shows a change in the amino acid level in blood measured in Test Example 2. The vertical axis indicates a change in the total plasma amino acid level (nmol/mL), and the horizontal axis indicates time (minutes).

The free branched-chain amino acid contained in the gel-like food composition is a free amino acid that has a branched structure in its side chain; and is, for example, at least one member selected from the group consisting of valine, leucine, and isoleucine. The free branched-chain amino acid is preferably at least two members freely selected from the group consisting of valine, leucine, and isoleucine, or is preferably all three of the members. Because of these free branched-chain amino acids contained, the gel-like food composition enables rapid absorption of branched amino acids into the body. From this perspective, the free branched-chain amino acids contained in the gel-like food composition are "added amino acids," and are distinguished from amino acids constituting the protein and the like.

The amount of the free branched-chain amino acids contained in the gel-like food composition is suitably determined, depending on the purpose, and is not particularly limited. For example, the content of the free branched-chain amino acids in a gel-like food composition is 0.1 to 10 wt %, and more preferably 1 to 5 wt %. As used here, "wt %" indicates a weight percentage containing water when the gel-like food composition contains water. When the food composition contains at least two free branched-chain amino acids, the ratio of the contents of these amino acids may be of any ratio. In one embodiment, when the gel-like food composition contains valine, leucine, and isoleucine, the ratio of the contents of these amino acids (on a weight basis) preferably satisfies the following: valine:leucine:isoleucine=0.5 to 2:2:0.5 to 2. Due to the branched-chain amino acids contained at such a ratio, the composition effectively provides recovery from exhaustion or muscle fatigue. Additionally, since leucine facilitates protein synthesis in vivo, a food composition containing leucine contributes to the stimulation of protein synthesis in vivo of the individual who consumes the composition.

The protein contained in the gel-like food composition is not particularly limited, as long as the protein is usable as a component of the gel-like food composition. At least one of any proteins is suitably selected and optionally combined for use. Examples of the protein include the following: animal proteins, such as casein, acid casein, casein sodium, casein calcium, whey protein, fish-meat protein, egg protein, and hydrolysates of these proteins; and vegetable proteins, such as soy protein, wheat protein, corn protein, and hydrolysates of these proteins. These proteins can be used singly, or in any combination of two or more. The proteins as used here are added proteins, and are distinguished from the total proteins contained in the gel-like food composition. In one embodiment, the protein is a water-soluble protein; and is, for example, whey protein.

The amount of the added protein contained in the gel-like food composition is suitably determined, depending on the purpose, and is not particularly limited. For example, the content of the added protein in the gel-like food composition is 1 to 12 wt %, preferably 3 to 11 wt %, and further preferably 5 to 10 wt %.

The saccharide that can be contained in the gel-like food composition is not particularly limited, as long as the saccharide is usable in the food and drink fields. At least one of any saccharides may be suitably selected and optionally combined for use. Examples of the saccharide include monosaccharides, disaccharides, oligosaccharides, sugar alcohols, dextrins, high-fructose corn syrup, and starch syrup. Examples of monosaccharides include glucose, fructose, galactose, mannose, ribose, arabinose, xylose, and rhamnose. Examples of disaccharides include sucrose, maltose, lactose, isomaltose, cellobiose, gentiobiose, palatinose, and trehalose. Examples of sugar alcohols include sorbitol, xylitol, mannitol, erythritol, maltitol, lactitol, and reduced palatinose. Examples of dextrins include maltodextrin. Examples of starch syrup include acid saccharified starch syrup and reduced starch syrup. These saccharides may be used singly, or in any combination of two or more. In one embodiment, a preferable saccharide is at least one member selected from the group consisting of sucrose, glucose, and dextrins; and a further preferable saccharide is sucrose.

The amount of the saccharide contained in the gel-like food composition may be suitably determined, depending on the purpose, and is not particularly limited. For example, the content of the saccharide in the gel-like food composition is 5 to 20 wt %, and preferably 7 to 15 wt %.

The gel-like food composition may contain a high-intensity sweetener in addition to the saccharide. Examples of the high-intensity sweetener include aspartame, Sucralose®, acesulfame potassium, saccharin, saccharin sodium, stevia, licorice extracts, glycyrrhizin, Siraitia grosvenorii extracts, neotame, somatin, mabinlin, brazzein, and monellin. The gel-like food composition may contain one member, or any combination of two or more members, of these high-intensity sweeteners.

The added free non-branched-chain amino acid that can be contained in the gel-like food composition refers to a free amino acid that has no branched chain in its molecular structure (i.e., amino acids other than the valine, leucine, and isoleucine described above). Examples of free non-branched-chain amino acids include alanine, arginine, asparagine, aspartic acid, aspartate, cysteine, citrulline, glutamine, glutamate, glycine, histidine, lysine, hydroxy lysine, methionine, phenylalanine, proline, hydroxy proline, serine, hydroxy serine, threonine, tryptophan, tyrosine, and hydroxy tyrosine. The gel-like food composition may contain one member, or any combination of two or more members, of these free non-branched-chain amino acids. In one embodiment, the gel-like food composition preferably contains free arginine. It is also preferable to contain free arginine from the standpoint of stimulating the insulin secretion and/or growth hormone, and enhancing anabolism to increase protein synthesis.

The amount of the free non-branched-chain amino acid contained in the gel-like food composition may be suitably determined, depending on the purpose, and is not particularly limited. For example, the content of the free non-branched-chain amino acid in the gel-like food composition is 0.1 to 2.5 wt %, and preferably 0.2 to 1.5 wt %.

The amount of the total proteins contained in the gel-like food composition may be suitably determined, depending on the purpose, and is not particularly limited. For example, the content of the total proteins in a food or drink composition is 0.5 to 15 wt %, preferably 1 to 15 wt %, and more preferably 7 to 14 wt %. The total proteins as used here refers to the concept of the total proteins contained in the gel-like food composition, including the total of the added proteins, added free branched-chain amino acids, and added free non-branched-chain amino acids.

The probiotic that can be contained in the gel-like food composition refers to a microorganism that improves the balance of intestinal flora and has a beneficial effect on the body; and is a concept including live bacteria, killed bacteria, and treated bacteria. The probiotic is not particularly limited, as long as the probiotic is usable in the food field. Examples of probiotics include the following: *Bifidobacterium adolescentis Bifidobacterium animalis, Bifidobacterium bifidum, Bifidobacterium breve, Bifidobacterium essensis, Bifidobacterium infantis, Bifidobacterium lactis, Bifidobacterium longunm, Lactobacillus acidophilus, Lactobacillus amylolyticus, Lactobacillus amylovorus, Lactobacillus alimentarius, Lactobacillus aviaries, Lactobacillus brevis, Lactobacillus buchneri, Lactobacillus casei, Lactobacillus cellobiosus, Lactobacillus coryniformis, Lactobacillus crispatus, Lactobacillus delbrueckii* subsp. *bulgaricus, Lactobacillus delbrueckii* subsp. *lactis, Lactobacillus farciminis, Lactobacillus fermentum, Lactobacillus gallinarumn, Lactobacillus gasseri, Lactobacillus helveticus, Lactobacillus helveticus, Lactobacillus hilgardii, Lactobacillus johnsonii, Lactobacillus kefiranofaciens, Lactobacillus kefiri, Lactobacillus mucosae, Lactobacillus oris, Lactobacillus panis, Lactobacillus collinoides, Lactobacillus paracasei, Lactobacillus paraplantarum, Lactobacillus pentosus, Lactobacillus plantarum, Lactobacillus pontis, Lactobacillus reuteri, Lactobacillus rhamnosus, Lactobacillus sakei, Lactobacillus salivarius, Lactobacillus sanfranciscensis, Lactococcus lactis, Leuconostoc citreum, Leuconostoc pseudomesenteroides, Leuconostoc lactis, Leuconostoc mesenteroides, Pediococcus acidilactici, Pediococcus dextrinicus, Pediococcus pentosaceus, Propionibacterium freudenreichii, Propionibacterium acidipropionici, Streptococcus faecalis, Streptococcus thermophilus, Tetragenococcus halophilus, Weissella confusa, Weissella halotolerans, Weissella kandleri, Weissella minor, Weissella paramesenteroides, Weissella viridescens, Bacillus subtilis,* and *Clostridium butyricum.*

The gel-like food composition may contain one member, or any combination of two or more members, of these probiotic lactic acid bacteria. The probiotic lactic acid bacterium contained in the food composition may be a live bacterium, a killed bacterium, or a treated bacterium. In one embodiment, the probiotic lactic acid bacterium is preferably a *Bifidobacterium longum* JBL01 strain, *Enterococcus faecalis* EC-12, a *Lactococcus lactis* subsp. *cremoris* FC strain, *Lactobacillus brevis* KB290, *Bifidobacterium longum, Bifidobacterium lactis, Lactobacillus delbrueckii* subsp. *bulgaricus* 2038, *Streptococcus thermophilus, Lactobacillus gasseri* SBT 2055, *Lactobacillus gasseri* PA-3, *Lactobacillus gasseri* OLL2716, *Bifidobacterium animalis* subsp. *lactis* LKM512, *Lactobacillus acidophilus* L-92, *Lactobacillus rhamnosus* GG, *Tetragenococcus halophilus* KK221, *Lactobacillus plantarum* YU, *Bifidobacterium animalis* subsp. *lactis* DN-173010, and *Lactobacillus paracasei* KW3110; more preferably those that have immunostimulation action, such as *Lactobacillus gasseri* OLL2809, *Lactobacillus casei* Shirota, a *Lactococcus lactis* JCM5805 strain, *Lactobacillus pentosus* S-PT84, *Lactobacillus bulgaricus* OLL1073R-1, and a *Lactobacillus pentosus* ONRICb0240 (b240) strain; and further preferably the b240 strain. The b240 strain was deposited on Aug. 6, 2003, in the National Institute of Advanced Industrial Science and Technology, International Patent Organism Depositary (IPOD) located in Chuo No. 6, 1-1-1 Higashi, Tsukuba, Ibaraki, Japan, with the depository number FERM P-19470; afterward, it was transferred to the international depository with the international depository number FERM BP-10065. In April 2012, the National Institute of Advanced Industrial Science and Technology, International Patent Organism Depositary was consolidated into the National Institute of Technology and Evaluation (NITE), Patent Microorganisms Depositary, and the microorganism depository operation has been succeeded by the National Institute of Technology and Evaluation Biotechnology Center, International Patent Organism Depositary (NITE-IPOD) (#120, 2-5-8 Kazusakamatari, Kisarazu-shi, Chiba 292-0818, Japan). The b240 strain is known to exhibit immunostimulation action, in particular IgA-production stimulatory action, anti-bird influenza antibody production stimulatory action, pneumonia prevention, cold prevention, and QOL improvement action. Thus, the gel-like food composition containing the L. ONRICb0240 strain can provide these effects to humans or animals that ingest the composition.

The amount of the probiotic contained in the gel-like food composition may be suitably determined, depending on the purpose, and is not particularly limited. For example, the content of the probiotic in the gel-like food composition is $10^4$/g to $10^{14}$/g, preferably $10^5$/g to $10^{13}$/g, and further preferably $10^6$/g to $10^{11}$/g. In another embodiment, the content of the probiotic bacterium in the gel-like food composition is, for example, 0.00001 to 50 wt %, preferably 0.00005 to 30 wt %, and further preferably 0.001 to 0.2 wt %. The probiotic bacterium contained in the gel-like food composition may be a live bacterium, a killed bacterium, or a treated bacterium.

In one embodiment, the gel-like food composition preferably contains an acidulant in order to mask bitterness, or to adjust the pH. Examples of the acidulant include organic acids, such as ascorbic acid, citric acid, gluconic acid, succinic acid, tartaric acid, lactic acid, fumaric acid, malic acid, adipic acid, and phytic acid; inorganic acids, such as phosphoric acid; and salts thereof. Examples of the salts include alkali metal salts, such as potassium and sodium. The gel-like food composition may contain one member, or any combination of two or more members, of these acidulants. The acidulant is preferably one member, or two or more members, selected from ascorbic acid, citric acid, gluconic acid, tartaric acid, lactic acid, malic acid, phosphoric acid, and salts thereof.

The amount of the acidulant contained in the gel-like food composition may be suitably determined, depending on the purpose, and is not particularly limited. For example, the content of the acidulant in the gel-like food composition is 0.1 to 5 wt %, and preferably 0.5 to 3 wt %.

In one embodiment, the gel-like food composition preferably contains a gelling agent. When the gel-like food composition contains a gelling agent, a food composition in a jelly form is provided. The gelling agent that can be contained in the food composition is not particularly limited, as long as the gelling agent is used in the food and drink field. Examples of the gelling agent include agar, carrageenan, xanthan gum, guar gum, pectin, gellan gum, locust bean gum, gum arabic, tragacanth, soybean polysaccharides, and gelatin. The food composition may contain one member, or any combination of two or more members of these gelling agents. In one embodiment, the gelling agent is preferably a soybean polysaccharide from the standpoint of dispersibility. The gel-like food composition may further contain, in addition to a soybean polysaccharide, one member, or two or more members, selected from agar, carrageenan, xanthan gum, guar gum, pectin, gellan gum, locust bean gum, gum arabic, and tragacanth. These are not particularly limited, as long as they are used in the food and drink field.

The content of the soybean polysaccharide in the gel-like food composition may be suitably determined, depending on the purpose, and is not particularly limited. For example, the content of the soybean polysaccharide in the gel-like food composition is 0.2 to 1.7 wt %, preferably 0.5 to 1.5 wt %, and more preferably 0.5 to 1.0 wt %.

The content of the gelling agent in the gel-like food composition may be suitably determined, depending on the purpose, and is not particularly limited. For example, the content of the gelling agent in the gel-like food composition is 0.2 to 3.0 wt %, preferably 0.5 to 2.5 wt %, and further preferably 0.7 to 2.0 wt %.

The pH of the gel-like food composition may be suitably determined, depending on the purpose, and is not particularly limited. For example, the pH of the gel-like composition is 3 to 5.0, preferably 3.2 to 4.2, and further preferably 3.3 to 4.0.

The food composition may contain, in addition to the components described above, an optional component used in the food and drink field. Such an optional component is, for example, one member of additives, such as flavorings, vitamins, minerals, antioxidants, coloring materials, emulsifiers, preservatives, seasonings, fruit juice extracts, vegetable extracts, and quality stabilizers; or a combination of two or more of these members.

The minerals are not particularly limited, and examples include sodium chloride, potassium chloride, calcium chloride, magnesium chloride, calcium lactate, and sodium lactate. These minerals may be suitably used singly, or in a combination of two or more.

The vitamins are not particularly limited, and examples include vitamin A, vitamin B1, vitamin B2, vitamin B6, vitamin B12, vitamin C, vitamin D, vitamin E, vitamin F, vitamin H, vitamin K, vitamin P, pantothenic acid, choline, folic acid, inositol, niacin, and para-aminobenzoic acid (PABA). These vitamins may be suitably used singly, or in a combination of two or more.

The gel-like food composition can be provided not only as general food and drink, but also as various functional (for-special-use) foods, such as dietary supplements, food for specified health use, food with nutrient function claims, food with functional claims, food for ill people, food for elderly people, food for physically fragile people, and food for athletes.

In one embodiment, the gel-like food composition is preferably ingested before, during, or after a physical activity. The "before a physical activity" as used here refers to, for example, within one day before a physical activity, preferably within a half-day before a physical activity, preferably within 6 hours before a physical activity, or preferably within 3 hours before a physical activity, further preferably within 1 hour before a physical activity, or further preferably within 30 minutes before a physical activity. The "after a physical activity" refers to, for example, within 1 day after a physical activity, preferably within a half-day after a physical activity, preferably within 6 hours after a physical activity, or preferably within 3 hours after a physical activity, further preferably within 1 hour after a physical activity, or further preferably within 30 minutes after a physical activity. In one embodiment, the gel-like food composition is preferably continuously ingested for a predetermined time period (e.g., 2 days or more, 3 days or more, 4 days or more, 5 days or more, 6 days or more, 1 week or more, and 1 month or more). The gel-like food composition may be ingested once daily, or multiple times a day (e.g., 2 times or 3 times).

In one embodiment, the gel-like food composition can be a degradation inhibitor of muscle protein, a fatigue recovery agent, and/or an immunostimulant.

The food composition can be obtained by mixing the components described above in accordance with any procedure. The food composition in the form of a drink or jelly can be obtained by dissolving the components in water, and optionally heating the solution.

In one embodiment, the gel-like food composition is preferably in a single-serve package form. The "single-serve package form" refers to a food in a predetermined amount for consumption in one serving. This package form is not particularly limited, and examples include pouches (e.g., aluminum pouches), bottles, cans, paper containers, and plastic bottles. In one embodiment, the package form is preferably a pouch with a spout. Multiple packages of the gel-like food composition in a single-serve package form may be ingested at one time (e.g., 2 packages or 3 packages). Under some circumstances, consumption in this manner may be preferable, for example, before or after intense physical activity.

The intake amount per serving is not particularly limited, and may be suitably determined, depending on the purpose. For example, the intake amount per serving is 50 to 400 g or 55 to 350 g, and more preferably 60 to 270 g.

EXAMPLES

The following describes the present invention in more detail, with reference to the Examples. However, the present invention is not limited to these Examples.

Example 1

Production Example 1

The components of each formulation 1 to 9 were dissolved in water, and the pH was adjusted, thereby preparing gelled compositions of formulations 1 to 9. Table 1 shows the amounts of free valine, free leucine, free isoleucine, and free arginine that were added as free amino acids.

TABLE 1

| | Formulation No. | | | | | | | | |
|---|---|---|---|---|---|---|---|---|---|
| | 1 | 2 | 3 | 4 | 5 | 6 | 7 | 8 | 9 |
| Whey Protein | 8.5 g | 8.7 g | 8.7 g | 8.7 g | 8.7 g | 8.7 g | 8.7 g | 8.3 g | Whey Peptide 8 g |
| Saccharide* | 9 g | 9 g | 9 g | 9 g | 9 g | 9 g | 9 g | 5.1 g | 4 g |
| Free Valine | 0.5 g | 0.5 g | 0.5 g | 0.5 g | 0.5 g | 0.5 g | 0.5 g | 1.0 g | 0.3 g |
| Free Leucine | 1.0 g | 1.0 g | 1.0 g | 1.0 g | 1.0 g | 1.0 g | 1.0 g | 2.0 g | 0.4 g |
| Free Isoleucine | 0.5 g | 0.5 g | 0.5 g | 0.5 g | 0.5 g | 0.5 g | 0.5 g | 1.0 g | 0.3 g |
| Free Arginine | 0.5 g | 0.5 g | 0.5 g | 0.5 g | 0.5 g | 0.5 g | 0.5 g | 0.5 g | 0.4 g |
| Lactic Acid b240 | $2.0 \times 10^{10}$ | $2.0 \times 10^{10}$ | $2.0 \times 10^{10}$ | $2.0 \times 10^{10}$ | $2.0 \times 10^{10}$ | $2.0 \times 10^{10}$ | $2.0 \times 10^{10}$ | $2.0 \times 10^{10}$ | $2.0 \times 10^{10}$ |
| Acidulant | Suitable Amount | Suitable Amount | Suitable Amount | Suitable Amount | Suitable Amount | Suitable Amount | x | Suitable Amount | Suitable Amount |
| Gelling Agent Other Than Soybean Polysaccharide | 0.96% | 0.96% | 1.3% | 0.96% | 0.96% | 0.96% | 0.96% | 0.96% | 0.35% |
| Soybean Polysaccharide** | 0.69% | 0% | 0% | 0.59% | 0.59% | 1.39% | 0.59% | 0.59% | 0% |
| Sweetener | Suitable Amount | Suitable Amount | Suitable Amount | Suitable Amount | Suitable Amount | Suitable Amount | Suitable Amount | Suitable Amount | Suitable Amount |
| Water | Suitable Amount | Suitable Amount | Suitable Amount | Suitable Amount | Suitable Amount | Suitable Amount | Suitable Amount | Suitable Amount | Suitable Amount |
| Total Weight | 100 g | 100 g | 100 g | 100 g | 100 g | 100 g | 100 g | 100 g | 35 g |
| pH | 3.7 | 3.8 | 3.7 | 3.8 | 3.8 | 3.8 | 5.3 | 3.8 | 3.8 |

*In formulations 1 to 8, sucrose was used; and in formulation 9, glucose was used.
**In formulation 5, CMC-Na was used.

Test Example 1

The gel-like food compositions of formulations 1 to 9 prepared in Production Example 1 were evaluated for flavor, texture in the mouth, and appearance. The following shows the evaluation criteria.
- Flavor (1: excellent, 2: very good, 3: average, 4: poor, 5: very poor)
- Change in Color (A: unchanged, B: slightly changed, C: slightly more changed, D: changed, E: significantly changed)
- Occurrence of Sedimentation (a: did not occur at all, b: rarely occurred, c: slightly occurred, d: occurred, e: significantly occurred)

Table 2 below shows the evaluation results.

TABLE 2

| | Formulation No. | | | | | | | | |
|---|---|---|---|---|---|---|---|---|---|
| | No. 1 | No. 2 | No. 3 | No. 4 | No. 5 | No. 6 | No. 7 | No. 8 | No. 9 |
| Flavor 1) | 2 | 4 | 4 | 2 | 4 | 3 | 5 | 4 | 4 |
| Color 2) | B | C | C | B | B | B | C | C | E |
| Dispersibility 3) | b | d | d | b | D | b | e | b | b |

Production Example 2

Prepared was 100 g of a gel-like food composition containing 9 g of sucrose, 8.7 g of whey protein, $2 \times 10^{10}$ of a lactic acid bacterium (b240), and 2.5 g of free amino acids (free branched-chain amino acid(s) and free arginine).

Test Example 2

Figure 2:
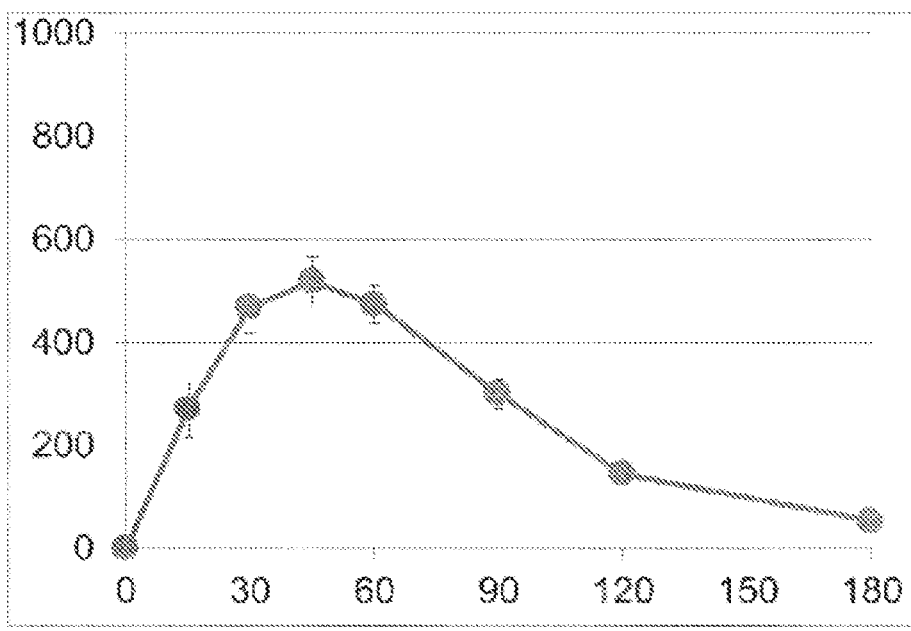
FIG. 2 is a graph that shows a change in the BCAA level in blood measured in Test Example 2. The vertical axis indicates a change in the plasma BCAA level (nmol/mL), and the horizontal axis indicates time (minutes).
Figure 3:
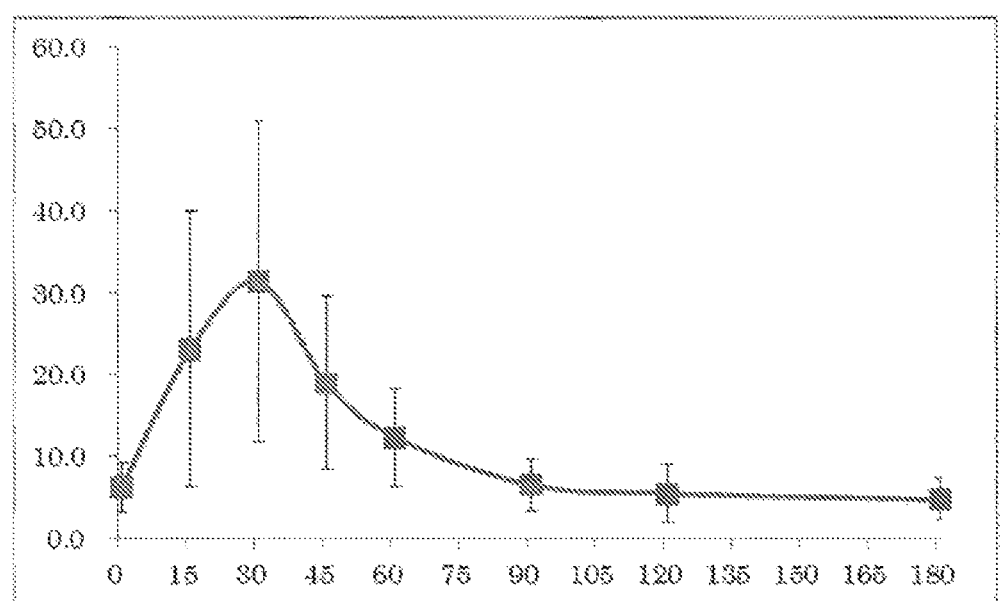
FIG. 3 is a graph that shows a change in the serum insulin level measured in Test Example 2. The vertical axis indicates the insulin level in blood (μU/mL), and the horizontal axis indicates time (minutes).

The gel-like food composition of Production Example 2 was administered one time to eight healthy male adults after an overnight fasting period. Their blood was collected before the ingestion, and at 15, 30, 45, 60, 90, 120, and 180 minutes after the intake, to measure their amino acid levels and serum insulin levels in blood. FIG. 1 shows a change in the measured amino acid levels in blood, and FIG. 2 shows a change in the BCAA levels in blood. FIG. 3 shows a change in the serum insulin levels. FIGS. 1 and 2 show peaks (at which values peak out) of the amino acid levels in blood and BCAA levels in blood at 45 minutes after the ingestion. These results suggest speedy absorption and speedy increases in the blood levels, caused by the intake of the gel-like food composition. Additionally, as shown in FIG. 3, the intake of the gel-like food composition facilitated the secretion of insulin, which stimulates protein synthesis, suggesting that protein metabolism in the body is disposed toward protein anabolism.

The invention claimed is:

1. A gel-like food composition comprising 1 to 10 wt % of a free branched-chain amino acid, 1 to 12 wt % of a protein, a probiotic in an amount of $10^4$ to $10^{14}$ cells/g of the gel-like food composition, a soybean polysaccharide in an amount of 0.2 to 1.7 wt % of the gel-like food composition, and a saccharide other than the soybean polysaccharide in an amount of 7 to 20 wt % of the gel-like food composition, said composition having a pH of 3 to 5.

2. The gel-like food composition according to claim 1, further comprising 0.1 to 2.5 wt % of a free non-branched-chain amino acid.

3. The gel-like food composition according to claim 1, wherein the protein is whey protein.

4. The gel-like food composition according to claim 1, wherein the saccharide other than the soybean polysaccharide is at least one member selected from the group consisting of sucrose, glucose, and dextrin.

5. The gel-like food composition according to claim 1, wherein the free branched-chain amino acid is at least one member selected from the group consisting of valine, leucine, and isoleucine.

6. The gel-like food composition according to claim 2, wherein the free non-branched-chain amino acid is arginine.

7. The gel-like food composition according to claim 1, wherein the probiotic is a lactic acid bacterium.

8. The gel-like food composition according to claim 1, which is in a single-serve package form.

9. The gel-like food composition according to claim 8, wherein the single-serve package form is 50 to 400 g.

10. The gel-like food composition according to claim 1, which is in a single-serve package form, the gel-like food composition being a degradation inhibitor of muscle protein, a fatigue recovery agent, and/or an immunostimulant.

* * * * *